United States Patent [19]

Schwartz et al.

[11] 3,795,092

[45] Mar. 5, 1974

[54] AIR FILTERING APPARATUS FOR ALLERGY SUFFERERS

[76] Inventors: Arthur G. Schwartz, 1119 Smyrna Ct., Sunnyvale, Calif. 94087; Robert J. Deffeyes, 1330 Carolina, Graham, Tex. 76046

[22] Filed: Sept. 2, 1971

[21] Appl. No.: 177,283

[52] U.S. Cl................ 55/473, 55/482, 55/DIG. 29
[51] Int. Cl............................................. B01d 46/54
[58] Field of Search.. 98/115 LH; 55/385, 473, 482, 55/500, DIG. 29, 472, 467, DIG. 16

[56] References Cited
UNITED STATES PATENTS

| 3,616,624 | 11/1971 | Marsh | 55/482 X |
| 3,176,447 | 4/1965 | Omohundro et al. | 55/DIG. 29 X |
| 3,158,457 | 11/1964 | Whitfield | 55/473 X |
| 3,019,854 | 2/1962 | O'Bryant | 55/DIG. 16 X |
| 2,096,553 | 10/1937 | Kucher | 55/385 X |

FOREIGN PATENTS OR APPLICATIONS

| 1,448,873 | 7/1966 | France | 55/385 |

*Primary Examiner*—Frank W. Lutter
*Assistant Examiner*—William Cuchlinski, Jr.
*Attorney, Agent, or Firm*—Louis J. Bachand

[57] ABSTRACT

An overbed filter unit incorporating a blower and an absolute filter capable of removing 99 percent and more of micron and greater size particles of dust and pollen from blower air with quiet, through the use of a continuous plenum extending circumferentially about the air blower to convey blower air at reduced velocity to the filter.

8 Claims, 4 Drawing Figures

PATENTED MAR 5 1974

3,795,092

INVENTORS.
ARTHUR G. SCHWARTZ
ROBERT J. DEFFEYES
BY
White, Haefliger & Bachand
ATTORNEYS.

AIR FILTERING APPARATUS FOR ALLERGY SUFFERERS

BACKGROUND OF THE INVENTION

This invention has to do with air quality management. More particularly the invention is concerned with apparatus for locally controlling the air environment. Specifically the invention comprises apparatus adapted to be located above a sleeping person's head to filter air passing to the person, to remove 99 percent and more of the dust and pollen from the air to be breathed by the person during sleep. Significantly, noise is minimized so as to not be disruptive of sleep through a novel large plenum design incorporated in the apparatus.

The invention achieves a major breakthrough in the fight to relieve allergy sufferers from overnight exposure to dust and pollen and the resultant morning sniffles and itching eyes. The benefits are extended into the day as the cumulative exposure to dust and pollen is sharply reduced, allergy symptoms are fewer and less discomforting through the control of breathing environment during the night.

PRIOR ART

While the filtering technology has been available for some time, previous efforts have been concentrated on large areas, e.g., from entire rooms or buildings, removal of dust particles and pollen, hereinafter simply "particles." This approach is unsatisfactory in an ordinary home where windows and doors are far from airtight and even were they, many are left open for psychological reasons or through carelessness.

There are scores of pollen which plague allergy sufferers, a group estimated to number upwards of 20 million persons in the United States. Dust is prevalent in all households, and urban airborne particulates are an increasing source of discomfort.

These particles can be removed from an air stream by passing the air stream through an electrostatic precipitator but the electrical crackling of this device is a disadvantage, precluding its use in sleeping areas in any but cases of extreme need. Absolute filters, developed primarily for "clean room" uses and capable of filtering 99.99 percent and more of micron-sized particles from an air stream are effective as filters for room air but they cannot cope with rooms opened repeatedly or continuously to additional dust and other airborne debris.

Absolute filters are perforce highly restrictive of air flow and thus considerable air pressure must be produced to obtain an airstream through the filter. It has been proposed in the past to use high pressure air blowers exhausting directly to the filter, or through a plenum directly between the blower and filter to realize adequate pressure for forcing air through the filter material. This arrangement may be satisfactory in light industrial use where noise is expected and relatively high levels tolerable or in institutional use where the blower machinery is isolated from the roon of air use, but in personal-sized overbed devices, blower motor noise and air noise must be kept to an absolute minimum, so that sleep is not disrupted. In addition, the velocity of air issuing from the filter to the person must be such that only a susurant breeze wafts past the sleeping person.

SUMMARY OF THE INVENTION

It is a major objective therefore of the present invention to provide a compact, personal-size, overbed air filtering apparatus which removes micron-size and larger dust and pollen particles, at sleep-compatible noise levels. Other objects will be apparent as the description proceeds.

This and other objects of the invention are realized with apparatus according to the invention for the management of air quality locally about the head of a person reclining or sleeping on a bed, without regard to the ambient air condition in the room. The apparatus includes a normally horizontally extended absolute filter capable of removing 99.99 percent of the micron-sized and larger dust and pollen particles from the air passing through the filter, the filter being arranged generally above the bed headboard to pass filtered air downwardly through a zone extending transversely of the bed and including the sleeping person's head. An air supply means to the filter is provided including a blower spaced above the filter and in a common vertical plane therewith. A continuous conduit means providing communication between the blower and the filter is provided and configured to pass blower pressurized air to the filter peripherally around the blower in the mentioned common plane thereby to lower the velocity of blower air emerging from the filter to a level not disruptive of the person's sleep.

The filter may comprise an air-passing rectangular shell and have supported therein an elongated web of nonwoven fiberglass which has been arranged into an axially compressed array of plural reverse folds, and air passing spacers between adjacent folds. In certain embodiments, there is provided an air expansion horn forming a portion of the conduit and surrounding the blower outlet, lying in the mentioned common vertical plane of blower and filter. The continuous conduit means may define a rectangular plenum extending circumferentially about the blower.

In specific embodiments, the continuous conduit means includes in a common plane including the blower a horizontal upper air passing channel vertically above the blower, a horizontal lower air passing channel vertically below the blower and above, and spaced from the filter, and vertically disposed air passing side channels laterally of the blower, the lower channel having an outlet to the filter and each of said channels being in continuous open, air-passing communication with the others to define the mentioned conduit means. A housing adapted to be mounted above the bed may be provided to support the filter in spaced relation to the bed, and to house the blower and continuous conduit means surrounding this structure and supporting it centrally of the conduit means. The housing which may be of molded synthetic organic polymer plastic foam, e.g., comprise top and side walls with a relatively dense inner and outer skin and a relatively highly foamed interior core therebetween, has a bottom opening into which the blower and absolute filter and supporting structure is receivable and an inlet opening through the housing upper wall communicating with the suction side of the blower, and also a prefilter between the inlet opening and the blower.

Mounted within the housing there may be provided front and rear individually formed panels having opposed abutting wall sections to define the blower mounting structure, and opposed spaced wall sections to define the mentioned air passing channels above, below and laterally of the blower, the panels being joined together at these wall sections which may be located centrally of the housing. The panels may further form filter support structure adapted to support the filter in angled relation to the horizontal plane including the bed.

BRIEF DESCRIPTION OF THE DRAWINGS

The invention will be further described as to an illustrative embodiment thereof in connection with the attached drawing in which.

DESCRIPTION OF THE PREFERRED EMBODIMENTS

Figures 1, 2, 3, 4:
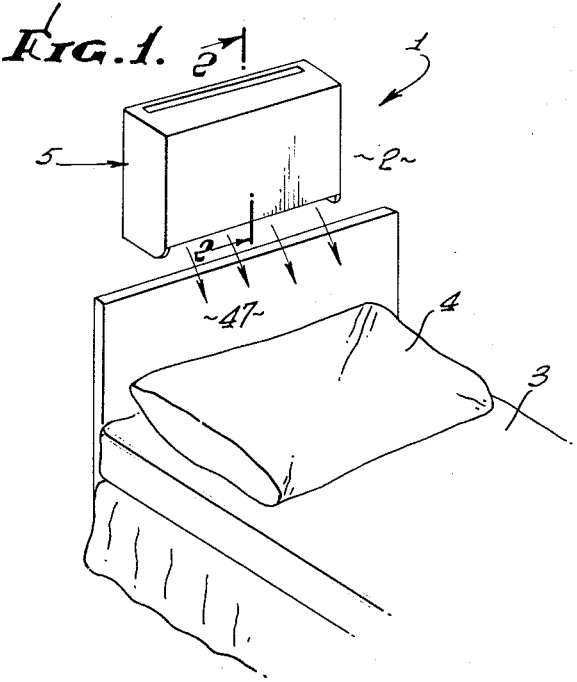
FIG. 1 is a pictorial view of a filter apparatus according to the invention, in location above a bed.
FIG. 2 is a view in vertical transverse section of the apparatus taken on line 2—2 in FIG. 3.
FIG. 3 is a view generally in vertical section of the apparatus taken on line 3—3 in FIG. 2.
FIG. 4 is a fragmentary perspective view of the absolute filter.

Referring now to the drawings and particularly FIG. 1, the invention filter apparatus, generally indicated at 1, is mounted to a wall 2 to be above bed 3 and specifically to overlie the area of the bed normally occupied by the sleeping person's head indicated by pillow 4. The apparatus 1 will generally project outward about 6 to 12 inches over the bed 3 and may be 33 inches wide for a single size bed or larger for other beds.

Referring now to FIGS. 2 and 3, the apparatus 1 comprises an exterior housing 5, a generally rectangular enclosure having an open bottom at 6, side walls 7 and front wall 8. The housing 5 is open-backed against wall 2 and apertured at 10 in the top wall 11 for ingress of air into the rear of the housing. An upper lip 12a is provided at the top back of the housing 5 to support the housing 5 on wall hook 13 in position over the bed 3. A resilient bumper 14 is provided adjacent the housing lower lip 12b at the lower rear edge 15 to cushion the housing 5 against the wall 2 and minimize vibration transmission to the wall.

The housing 5 may be formed of synthetic organic polymer or other material, and suitably is formed of foamed plastic which is both decorative and sound absorptive.

Within the housing 5, the filtering apparatus proper is provided. As indicated, the apparatus includes the filter unit per se shown at 16, a blower 17 and means to convey blower pressurized air around the blower to the filter unit in the form of blower horn 18 and circumferential conduit 19.

The several components in one embodiment of the invention are conveniently formed or supported by the assembly of mating front and rear panels 20, 21 which minimizes assembly time, tooling cost and parts inventorying problems.

The panels 20, 21 are suitably formed from vacuum formed sheet or molded or rotationally cast plastic, such as vinyl, polyethylene, polystyrene, polypropylene or like synthetic organic polymer, which may be foamed for lighter weight or increased stiffness.

The panels 20, 21 include wall members 22, 23 defining U-shaped horizontally disposed recesses 24, 25 respectively. Flanges 26, 27 of the wall members 22, 23 abut to form conduit 19 in the form of enclosed serial passages or channels. As best shown in FIG. 3, the conduit 19 comprises an upper channel 28, a lower channel 29 and side channels 30, 31, each of the channels being in open air flow communication, one with another, to together form the conduit 19, lying in the plane of the housing 5 and extending in a closed loop inwardly of the housing perimeter, and defining central area 32 within the housing.

Panels 20, 21 further include central wall members 33, 34 extending parallel to the longitudinal axis of the housing 5 and abutting approximately along this axis in the housing central area 32. The central walls 33, 34 are joined together by a series of fasteners 35 such as nut and bolt fasteners. Front panel 20 has formed therein a blower housing 36 of generally circular vertical cross-section and housing blower fan 37, opening to the side to a blower expansion horn 18 which serves as the outlet from the blower housing. Horn 18 connects at its maximum opening with side channel 30 with which it is in open communication, whereby blower air from blower housing 36 passes along horn 18 into side channel 30 and, as best shown in FIG. 2, either downwardly into lower channel 29 vertically below the blower housing 36 or upwardly into upper channel 28 vertically above the blower housing 22. Absolute filter unit 16 is carried in angled or cocked relation relative to the bed 3, supported by depending arm portions 39 and 40 of the front and rear panels 20, 21 respectively, secured and sealed therein by means not shown.

The filter unit 16 comprises an air passing rectangular shell 41 generally formed of plywood, and a filter body 42 therein comprised of an elongated web 43 of nonwoven fiberglass, arranged into an axially compressed array of plural reverse folds 44, air passing spacers 45 being provided between adjacent folds. See FIG. 4. The filter body 42 forms the lower wall of lower channel 29 and provides the only outlet for blower pressurized air.

It will be observed that the several channels together as conduit 19 define a plenum extending circumferentially of the blower 17. The blower pressurized air is reduced in velocity as it expands in passage through blower horn 18 and into the plenum to the filter unit 16 to produce a gentle, barely sensible breeze of purified air at the filter face 46 and into the zone 47 extending to the bed where a person's head would normally lie at a convenient angle of delivery for personal comfort dictated by the angled disposition of filter unit.

Blower motor 48 is supported on rear panel center wall section 34 by strap 49 secured to the wall section by the fasteners 35. A feature of the described panel arrangement is the double wall thickness obtainable in the center area 32 of the apparatus by the abutment of panel center wall sections 33, 34 which sections together provide mounting structure generally indicated at 50 for the blower fan 37 and blower motor 48. A prefilter 51 of matted fiberglass or other material, relatively more porous than absolute filter unit 16, is provided supported by frame 52 formed in rear panel 21 to filter air passing from the apparatus inlet to the blower 17.

We claim:

1. Apparatus for the management of air quality locally in a zone surrounding the head of a person reclining on a bed including a housing above said zone, said housing comprising front and side walls and having centrally thereof a wall structure of double thickness relative to said front and side walls to define a blower support structure, an absolute filter supported by the support structure in normally horizontally extended and downward air-passing relation with said zone, said absolute filter being capable of removing micron-sized and larger dust and pollen particles from the air passing through the filter, air supply means to said filter including a blower spaced above the filter and in a common vertical plane therewith supported on said blower supported structure, and continuous conduit means providing communication between said blower and said filter and configured to pass blower-pressurized air to the filter peripherally around the blower in said common plane and including an air expansion horn, said continuous conduit surrounding the blower support structure, whereby said structure supports the blower centrally of the conduit means.

2. Apparatus according to claim 1 in which said filter comprises an air passing rectangular shell and supported therein an elongated web of nonwoven fiberglass, said web being arranged into an axially compressed array of plural reverse folds, and air passing spacers between adjacent folds.

3. Apparatus according to claim 1 in which said continuous conduit means includes in said common plane including the blower, a horizontal upper air passing channel vertically above the blower, a horizontal lower air passing channel vertically below the blower and above said filter and vertically disposed air passing side channels laterally of the blower, the lower channel having an outlet to said filter and each of said channels being in continuous open air passing communication with the other to define said conduit means.

4. Apparatus according to claim 1 in which said housing includes a bottom opening into which said blower, absolute filter and blower support structure is sealably receivable and an inlet opening communicating with the suction side of said blower and including also a prefilter between the inlet opening and the blower.

5. Apparatus for the management of air quality locally about the head of a person reclining on a bed, which comprises a housing adapted to be mounted above a bed, and mounted within the housing front and rear individually formed panels having joined together opposed abbutting wall sections defining blower mounting structure, and opposed spaced wall sections defining a conduit including air passing channels above, below and laterally of the blower mounting structure, a normally horizontally extended absolute filter capable of removing micron-sized and larger dust and pollen particles from the air passing through the filter and arranged to pass filtered air from said conduit downwardly from the housing, a blower spaced above said filter and in a common vertical plane therewith, supported by said blower mounting structure, and an air expansion horn communicating the pressure side of the blower with said air passing channels said housing including a bottom opening into which said blower, absolute filter and blower mounting structure is sealably receivable, and an inlet opening communicating with the suction side of the blower; and a prefilter between the inlet opening and the blower.

6. Apparatus according to claim 5 in which said abutting panel wall sections are located centrally of the housing.

7. Apparatus according to claim 6 including also filter support structure formed by said panels, said structure being adapted to support such filter in angled relation to the horizontal plane including the bed.

8. Apparatus according to claim 5 in which said housing comprises foamed synthetic organic plastic.

* * * * *